United States Patent

[11] 3,580,296

| [72] | Inventors | Ernest P. Carter<br>Durham;<br>Robert P. Bell, Jr., Cary; Alton P. Carroll, Jr., Durham, N.C. |
|---|---|---|
| [21] | Appl. No. | 744,078 |
| [22] | Filed | July 11, 1968 |
| [45] | Patented | May 25, 1971 |
| [73] | Assignee | Monsanto Company<br>St. Louis, Mo. |

[54] ARTICLES WOVEN FROM NONEXTENSIBLE MATERIALS
6 Claims, 2 Drawing Figs.

[52] U.S. Cl. ................................................. 139/425, 139/97

[51] Int. Cl. ........................................................ D03d 15/02
[50] Field of Search ................................................ 139/420 (Inquired), 425, 425.5, 426, 383, 29—33, 97; 161/70; 140/3, 107

[56] References Cited
UNITED STATES PATENTS

| 2,502,691 | 4/1950 | Allan et al. ................ | 139/33 |
| 3,306,322 | 2/1967 | Willmann ..................... | 139/425.5 |

Primary Examiner—Henry S. Jaudon
Attorneys—Robert L. Broad, Jr. and Roy P. Wymbs ABSTRACT: A method and apparatus for weaving a composite fabric having a mixed warp of alternating ends of extensible and nonextensible yarns, and a fill of a flexible, extensible yarn.

Patented May 25, 1971 3,580,296

INVENTORS
ERNEST P. CARTER
ROBERT P. BELL, JR.
ALTON P. CARROLL, JR.

BY Robert L. Broad Jr.
ATTORNEY

ARTICLES WOVEN FROM NONEXTENSIBLE MATERIALS

BACKGROUND OF THE INVENTION

1. Field of the Invention

This invention relates to an improved loom design and method of operation for weaving fabrics of nonextensible materials. More particularly this invention relates to a method and equipment for weaving a composite fabric comprising a warp of alternating ends of nonextensible material and extensible material, and a fill of an extensible material.

2. Description of the Prior Art

Recent developments in the field of high strength, temperature resistant materials have included the use of low density, high modulus, high melting point whiskers or short monofilaments of inorganic refractory fibers such as boron, boron carbide, carbon, silicon carbide, silicon nitride and alumina-silica as reinforcing agents for metals and plastics. These materials are characterized by extremely high strength and modulus, brittleness, limited flexibility, and by essentially zero elongation which is indicated by the term "nonextensible."

Efforts are now being directed toward producing these nonextensible materials in continuous monofilament form. Continuous filament boron and boron carbide now commercially available are formed by vapor deposition on a fine wire tungsten substrate.

One method of employing these boron filaments as a reinforcing material in epoxy or other resin laminates is to distribute short lengths of the filaments throughout the resin in a random manner. Another more effective method is to form nonwoven webs of the filaments impregnated with the resin, and to combine several of these webs to form the desired laminated article. By this method a laminate of good strength may be obtained.

Both of the above methods suffer from one serious deficiency. Where the expense of forming laminated structures from the very costly boron filaments is justified, it is so justified because the light weight and high strength properties are critical to the end use. Maximum strength can only be obtained by using continuous length filaments of the boron which are arranged within the laminated structure so that the high tensile strength of the boron is utilized to a maximum For ease of handling and laminate lay up, it is therefore desirable to provide a woven fabric of continuous filament boron which can be precisely arranged in the laminate structure to obtain maximum laminate strength.

SUMMARY OF THE INVENTION

Although the art of weaving is ancient, the nonextensible and brittle nature of nonextensible filaments such as boron precludes their processing on conventional weaving equipment. We have found that when attempting to weave a continuous boron filament warp with a fiberglass or other flexible yarn fill on convention equipment, the boron filaments are broken with great frequency by the action of the heddles. Since the boron filaments are nonextensible, the warp goes slack at each heddle midstroke, and is pulled taut again at the end of the heddle stroke. This bending and variable tension causes the boron filaments to break and also results in a nonuniform fabric weave.

By "nonextensible" filament is meant to those filamentary materials that have essentially zero elongation when tension is extended in a lengthwise direction with the net result that the filaments breaks rather than stretches.

It is therefore one object of this invention to provide a method and apparatus suitable for weaving fabrics containing a continuous nonextensible fiber in the warp and an extensible flexible fiber in the fill.

It is another object of this invention to provide a method and apparatus for weaving a fabric having a mixed warp comprised of two different filamentary materials, one of which is a nonextensible continuous filamentary material.

These and other objects of this invention will be evident from the ensuing description of the invention.

The objects of this invention are generally accomplished by improving a conventional loom to provide two beam rolls and a shuttle operable in an upper and lower plane. More particularly, this invention relates to an improved loom for weaving nonextensible materials comprising (a) a frame; (b) two beam rolls mounted to said frame, one roll having thereon a warp of nonextensible filaments, the other having a warp of extensible yarn; (c) takeup means supported by said frame and positioned in relation to said beam rolls as to take up their respective warps; (d) a plurality of heddles for raising and lowering the flexible warp so as to form upper and lower sheds in consecutive shedding operations in relation to the nonextensible warp lying substantially in a horizontal plane and forming a common side between said sheds; (e) a shuttle for placing a flexible fill in the sheds, the shuttle lowering and raising with the heddles; and (f) means for collecting the woven nonextensible material on said takeup means. The details of these improvements are illustrated in the accompanying drawing which is a schematic representation of one preferred embodiment of this invention, and the invention may be more readily understood by reference thereto.

DESCRIPTION OF THE PREFERRED EMBODIMENT

Figure 1:
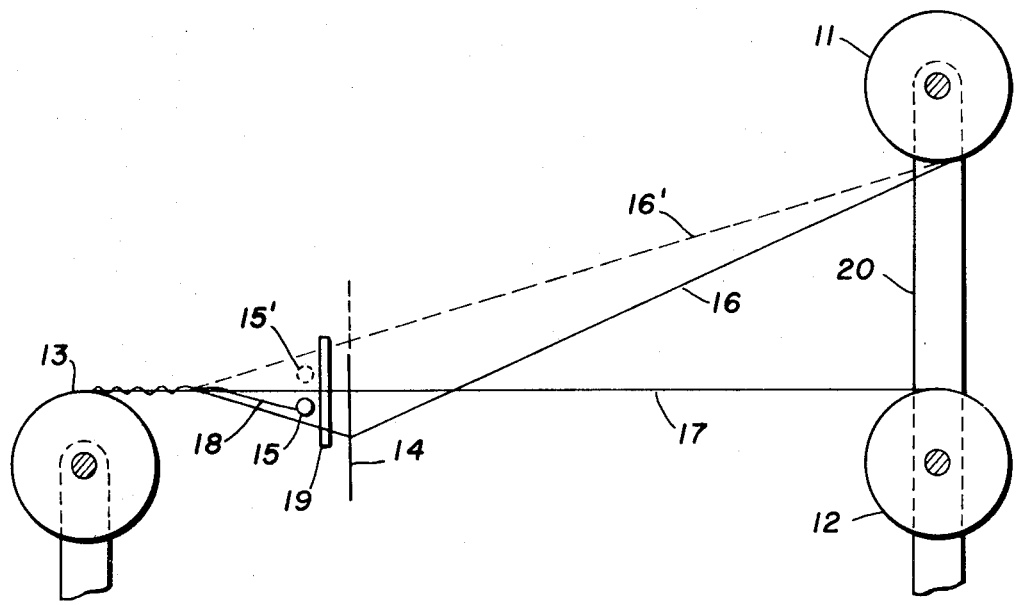
FIG. 1 is a general schematic representation of a loom showing the rolls in relation to the heddle and takeup roll after the instant invention.

In the drawing, a beam roll 12 is positioned horizontally with respect to a takeup roll 13, so that nonextensible filaments 17 pass between the rolls in a straight line, bypassing heddles 14 so that these filaments 17 are never subjected to vertical movement. A beam roll 11 is positioned adjacent the beam roll 12 and attached to a frame 20 and feeds a flexible or extensible warp yarn 16 through a plurality of heddles 14 onto takeup roll 13. A flexible yarn 16 is displaced vertically by the heddles from yarn line 16 to yarn line 16'. The heddle action on the flexible yarn forms the shed necessary between the flexible yarns and the nonextensible filaments for passage to shuttle 15 carrying the fill yarn. The shuttle operates alternately in a lower 15 and upper 15' plane on either side of the nonextensible filaments 17, coinciding with the lower 16 and upper 16' positions of the flexible yarn extending between beam roll 11 and takeup roll 13.

Takeup roll 13 is driven by a pick wheel (not shown) which is mechanically connected to the heddles by conventional means (not shown) so that the heddles operate and woven fabric is taken up after each pass of the shuttle. Other takeup means will become obvious to those skilled in the art so as to takeup incremental amounts of the fabric produced. The shuttle may be passed through the shed by hand or by conventional mechanical means. If the shuttle is operated by hand the fill yarn may be laid in place, and the beater bar 19 shown may be omitted from the loom. If mechanical means are employed, the shuttle throw system must necessarily be modified to be raised and lowered with the heddles and the beater bar 19 must be incorporated, modifications easily accomplished by a skilled mechanic informed of the method of loom operation as described herein.

Figure 2:
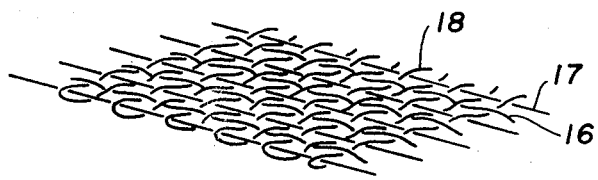
FIG. 2 is a depiction of the fabric produced by the method of the instant invention.

The fabric produced by the method of this invention is characterized by the fact that the nonextensible warp yarns lie in a substantially flat plane while the extensible warp yarns and fill yarns lie in a sinusoidal wave pattern passing over and under each other. This construction is readily seen in FIG. 2 where 17 is the nonextensible warp yarn, 16 is the extensible warp yarn, and 18 is the fill yarn. In a preferred embodiment of the instant invention, nonextensible yarn 17 is a boron filament, extensible yarn 16 is either glass or nylon and the fill yarn 18 is nylon. Of course, other extensible materials may be employed as polyesters and polyimides.

Although the foregoing description has been directed primarily toward weaving fabrics containing boron monofilaments, the method is not limited thereto but is equally applicable using continuous filaments of any nonextensible material which does not lend itself to weaving on conventional looms.

We claim:

1. An article of manufacture having a woven composite fabric comprising a warp of alternating ends of nonextensible material and extensible material, said nonextensible material being characterized by high strength and modulus, brittleness, limited flexibility and essentially zero elongation, said nonextensible material being in a substantially flat plane and the extensible material being in a sinusoidal path and a fill of an extensible material.

2. An article of manufacture having a composite fabric as defined in claim 1 wherein the nonextensible warp is continuous filament boron.

3. An article of manufacture in accordance with claim 1 in which the nonextensible warp is continuous filament boron and the extensible material is a polyimide.

4. An article of manufacture in accordance with claim 1 which the nonextensible warp is continuous filament boron and the extensible material is a polyester.

5. An article of manufacture in accordance with claim 1 in which the nonextensible warp is silicon.

6. An article of manufacture in accordance with claim 1 in which the nonextensible warp is boron carbide.